Figure 1:
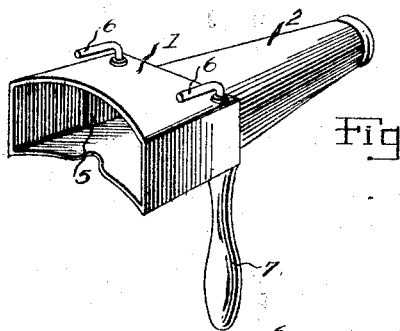

Aug. 25, 1925.

G. PARSON 1,551,114

EYE TESTING APPARATUS

Filed Dec. 23, 1924 — 2 Sheets-Sheet 1

Inventor:
George Parson
By Dodge & Sons,
Attorneys.

Aug. 25, 1925.
G. PARSON
1,551,114
EYE TESTING APPARATUS
Filed Dec. 23, 1924    2 Sheets-Sheet 2
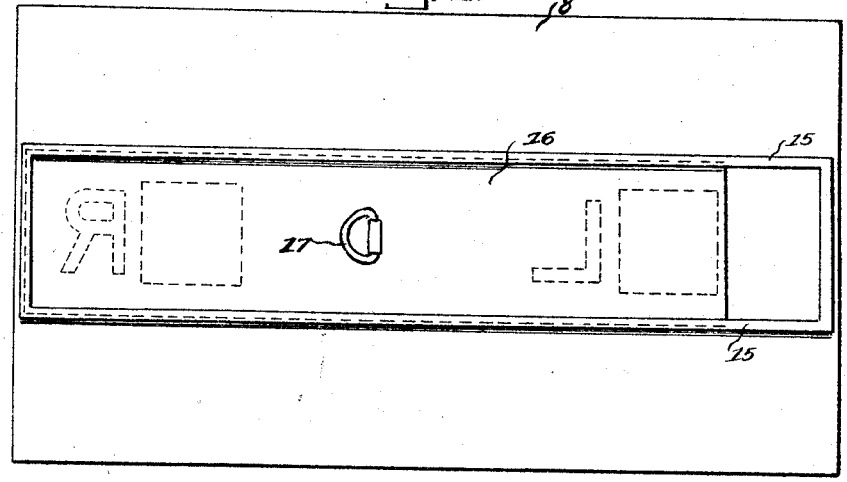
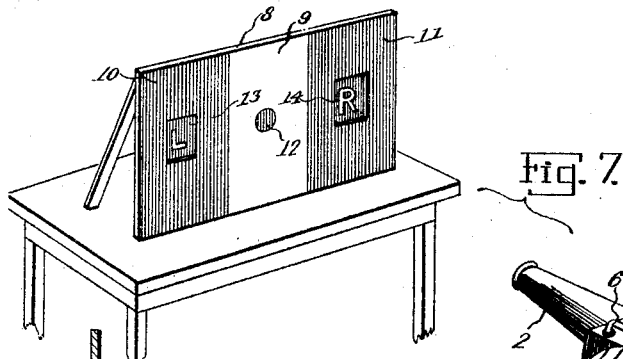
Inventor:
George Parson,
By Dodge & Sons
Attorneys.

Patented Aug. 25, 1925.

1,551,114

UNITED STATES PATENT OFFICE.

GEORGE PARSON, OF PROVIDENCE DISTRICT, VIRGINIA.

EYE-TESTING APPARATUS.

Application filed December 23, 1924. Serial No. 757,724.

*To all whom it may concern:*

Be it known that I, GEORGE PARSON, a citizen of the United States, residing in Providence District, in the county of Fairfax and State of Virginia, have invented certain new and useful Improvements in Eye-Testing Apparatus, of which the following is a specification.

This invention pertains to a means or to apparatus for ascertaining simply and with certainty which of the two eyes of a person is the dominant eye, it being a known fact that in all visual operations in which the sighting or aiming faculty is brought into play, one eye alone is effectively employed, and that even though an impression is or may be simultaneously received by the other eye, it is so dominated by the one received by the sighting eye as to remain virtually unnoticed. The apparatus comprises a sighting instrument and a target to be used therewith.

The fact that some persons sight with the right eye, or that the right eye dominates the left, and vice versa, has been noted, but the cause of this domination has not heretofore been clearly understood, nor have the consequences been appreciated. It is believed, and numerous investigations which I have made afford strong support for the belief, that to this dominance of one eye over the other are properly to be ascribed certain other physical phenomena, such as the preferred use of one hand, either right or left, for performing a wide range of manual operations, notably writing, use of weapons, and the employment of various implements and tools.

In the act of sighting, aiming, or visually bringing objects into exact alinement, one eye is frequently closed, especially when extreme precision is desired. In other instances, however, both eyes are kept open, but even in such cases the sighting eye dominates the other, so that the effective sighting is in fact a monocular or unilateral operation, and not binocular or bilateral. Binocular sighting in the true sense of the word is an optical impossibility, since any attempt to bring objects into exact visual alinement when both eyes are functioning equally invariably results in the formation of double images. It follows that monocular sighting, even when both eyes are open, is an optical necessity.

Figure 2:
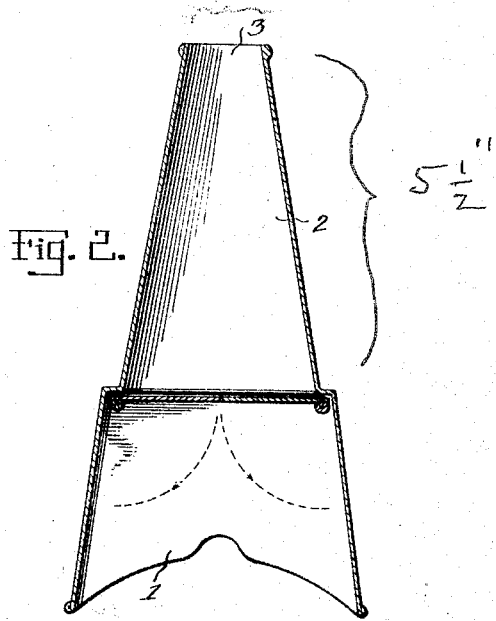
Figure 3:
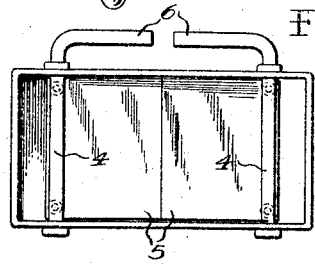
Figure 4:
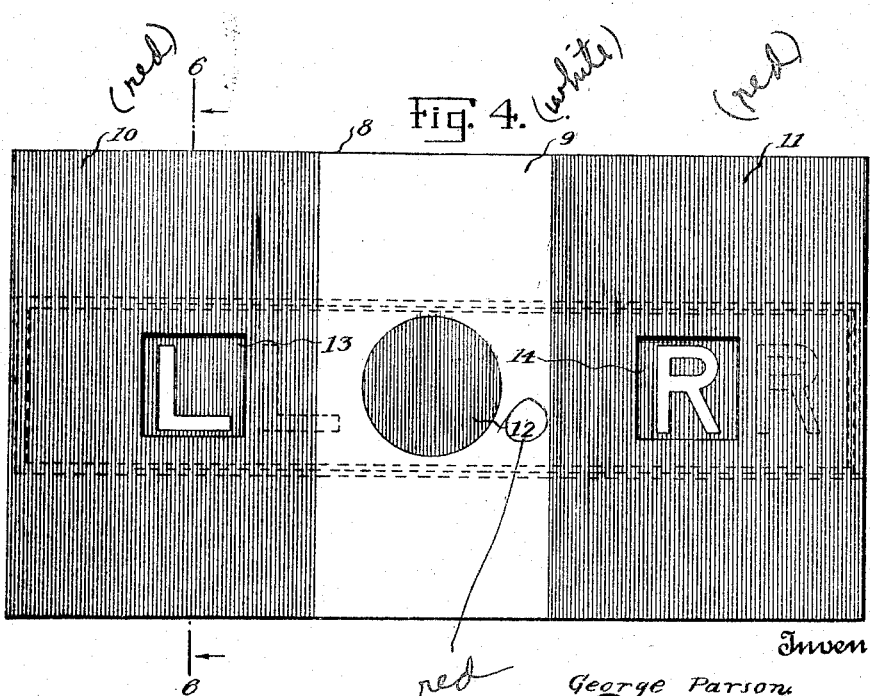

The apparatus about to be described is predicated upon this theory, the correctness of which has, in my judgment, been established by a great number of practical tests made with the aid of said apparatus. Without further referring to the theory at this point, the apparatus will be described in connection with the accompanying drawings, in which:

Figure 1 is a perspective view of the sighting instrument with the left-hand valve shown open and the other valve hidden from view;

Fig. 2, a horizontal section through the same showing the two valves closed across the body of the sighting instrument, their paths of movement in opening being indicated by dotted lines;

Fig. 3, a rear end view of the sighting instrument also showing the valves closed;

Fig. 4, a front view of a target to be used in connection with the sighting instrument shown in the preceding figures;

Fig. 5, a rear view of the same;

Fig. 6, a transverse sectional view of the target, on the line 6—6 of Fig. 4;

Fig. 7, a perspective view showing the manner of using the sighting instrument and the target.

The testing or sighting instrument in its preferred form comprises a box-like body 1 open at its rear end, and curved at said end to conform approximately to the curvature of the average human forehead. The width of the box is about four and one-half inches at the rear or wider end, to bring both eyes well within its sides, and it is of a depth or vertical measurement sufficient to extend above and below the eyes of the person being examined, much after the manner of the stereoscope. The forward side of the box 1 has attached to and projecting from it a flattened and preferably tapering extension 2, terminating at its outer end in an opening of about one and one-eighth inches in diameter. This extension is advisably about five and one-half inches in length, which with the box portion 1 gives a total length of approximately nine inches. These dimensions may be varied within reasonable limits, but are found suitable for practically all persons. The sighting instrument as a whole is preferably made of thin metal, but may be of any suitable material, such as wood, hard rubber, celluloid, bakelite, or even of a good quality of cardboard.

At the forward side of the box 1 is formed an opening 3 of elliptical shape corresponding to the larger end of the funnel-like extension 2, and in the corners or angles formed by the meeting of the side and front walls of said box 1 are pivotally mounted vertical spindles 4, each carrying a shutter or valve 5, the free edges of which when swung into position parallel with the front of the box, meet or slightly lap at the mid-width of the box, as indicated in Fig. 2. The interior of the box 1 and its extension 2 is preferably darkened, as are also the shutters or valves 5. Each of the spindles 4 is provided with a horizontal arm 6 or equivalent means, by which to turn them to bring the valves into common plane, or to move either across the forward opening in the box 1, or to throw either or both against the inner side walls thereof.

While it is preferred to taper the forward extension 2 of the sighting instrument, this is not essential since if the opening 3 be in the indicated relation to the box 1, the effect will be the same.

7 designates a handle which may be provided if desired, but which in practice is not essential, and is perhaps undesirable ordinarily.

It will be seen that with the sighting or testing instrument constructed as above described and placed with its rear open end resting against the forehead, the axis of the instrument extending from a point midway between the eyes, and the shutters 5 thrown open, the user can look with both eyes through the opening 3 at any suitable object outside the instrument, which, however, is intended to be used in connection with a special target shown in Figs. 4, 5, 6 and 7. This target consists of a flat sheet 8 of cardboard, wood, metal, celluloid, or other suitable material, the front face of which is divided into three zones, the mid-zone 9 being of a color to contrast with the lateral zones 10 and 11. I find white for the mid-zone and red for the lateral zones answer well, but any sharply contrasting colors may be employed.

The mid-zone 9 has a centrally located spot 12, corresponding to the bull's-eye of an ordinary rifle target, and here indicated as red in color to contrast with the white ground of the mid-zone. The lateral zones are provided with central openings 13 and 14, which are in horizontal alinement with the center 12 of the target, and are shown as of rectangular form.

Movable in guides 15 on the rear face of the target is a slide 16, preferably the same color as the lateral zones of the target, and bearing in white or other contrasting color, the letters "L" and "R" respectively, or other suitable symbols. These letters or symbols should in any case differ one from the other, and may if desired be readily removable or changeable, to the end that the person whose eyes are being examined may not, through seeing the symbols in advance of the test, or through being informed by others as to their design or character, be influenced by the knowledge of what the symbols will be when displayed. The symbols may be printed or otherwise produced on slips of paper of like size, and provided with gum on their rear surfaces as a simple and convenient mode of making substitution. The slide is normally so adjusted as to hold the symbols out of register with the target openings 13 and 14, and is provided with a bail or loop 17 by which it may readily be moved to display or to hide from view the symbols.

In using the sighting instrument and the target, the person conducting the test places the target with the symbols on the lateral zones 13 and 14 screened, the target being held in a vertical plane at a suitable distance from the person tested, usually about two feet. The subject places the sighting instrument to the eyes as in Fig. 7, with both shutters 5 thrown open, and is requested to look through the instrument at the central spot 12 of the mid-zone 9. In almost every instance the subject will at once throw the forward end of the instrument slightly to one or the other side of a line passing axially through it to the central spot or bull's-eye 12 of the mid-zone, and in response to a question will state that said central spot or bull's-eye is seen. The slide 16 will then be moved by the person conducting the test, to display the symbols thereon at the openings 13 and 14 of the lateral zones, and he will then ask the subject what else is seen. If the subject also sees the symbol of the right-hand lateral zone, this indicates that he is right-eyed or habitually sights with the right eye. Similarly, if the subject indicated that he sees the symbol of the left-hand lateral zone, this indicates that he is left-eyed or habitually sights with the left eye.

If it be desired to do so, either shutter 5 may be closed, thus cutting off the sight or view of the corresponding eye of the subject. Accordingly, if the subject be right-eyed and the left-hand shutter 5 be closed, the central spot 12 of the mid-zone will remain in full view but no letter or symbol will be seen at the openings 13 and 14, or either of the openings of the lateral zones. If instead of the left, the right shutter be closed, the letter "R" will be seen, but the central spot 12 of the mid-zone will not be seen. This conclusively shows that the dominant right eye, assuming the subject to be right-eyed, determines the pointing of the instrument in sighting upon the central spot 12 of the mid-zone, and that the left eye sights on an intersecting sight line the letter "R" of the right-hand lateral zone, because closing the left-hand shutter 5 cuts off the view of the left eye completely, while the instrument remains sighted on the spot 12 which is seen by the right eye. On the other hand, if the right-hand shutter 5 be closed, the vision of the right eye is cut off, while the left eye as before views the symbol of the right-hand lateral zone, assuming that the instrument be not shifted in position.

The converse of this is equally true; that is to say, a left-eyed person would point the instrument so that the left eye would sight upon the central spot 12 of the mid-zone, while the right eye would sight upon the symbol in the left-hand lateral zone, and closing of the left-hand shutter would cut off the vision of the left eye, thus causing the central spot 12 of the mid-zone to disappear but leaving the symbol of the left-hand lateral zone in view and seen by the right eye, still assuming that the position of the instrument be not shifted. If, now, the left-hand shutter be opened and the right-hand shutter be closed, the left-eyed person will still see the central spot of the mid-zone, but will not see either symbol of the lateral zones.

These tests definitely determine whether the right or the left eye of the person examined is the dominant or sighting eye, and demonstrates clearly that one or the other eye does dominate, and that the sighting is monocular or unilateral and not binocular or bilateral. The tests are important in view of the fact that a right-eyed person, under normal conditions, is right-handed and right-footed, and a left-eyed person is, also under normal conditions, left-handed and left-footed. The native condition of right-eyedness or left-eyedness accounts for right-handedness or left-handedness, as the case may be, except in those instances in which some injury to one hemisphere of the brain, or to the right hand or the left hand, or to the nerves and muscles controlling the same, or special training, has caused a departure from the normal coincidence of right-eyedness and right-handedness or left-eyedness and left-handedness. This normal correlation of function may also, of course, be disturbed by ocular disease or injury, causing the original sighting eye to be supplanted in dominance by its mate.

It is unnecessary to go further into these matters, however, since the invention here set forth pertains simply to the apparatus employed for determining whether the subject be right-eyed or left-eyed.

It is obvious that the details of construction of the sighting device may be varied considerably without departing from the spirit and scope of my invention, the essential features of which consist in a box-like cell or chamber, open at one end to permit it to be applied to the eyes of a person and practically to exclude the light, said chamber being provided at its forward end with a relatively small opening through which the user may view objects beyond, said opening being symmetrically located with reference to the sides of the box-like structure, or centered in a vertical mid plane of sight of the user's eyes. The construction of the valves or shutters may be varied at will, provided it be such as to permit obstruction and restoration of the view of either or both eyes at will.

The target may likewise vary in construction so long as provision be made for exposing or screening suitable symbols at will at the opposite sides of the central zone. The dimensions of the target may vary within reasonable limits, a convenient size being about eighteen inches in length by nine in width, and the openings in the lateral zones for the display of the symbols being approximately ten inches between centers. The several dimensions suggested in the specification are those which are found suitable in practice, having regard to average conditions, but may of course be varied as conditions or circumstances shall suggest.

The proportions of the sighting instrument and of the target here indicated have been worked out with due regard to bringing the symbols of the lateral zones into the lines of sight of the respective eyes of the subject, with the target held at about the distance suggested. If it be desired to place the target at a greater distance, it will be proportionately lengthened, and the symbols of the lateral zones will be so spaced from the central spot of the mid-zone that the extended line of vision of the dominant eye shall center upon said central spot, and the extended line of vision of the other eye shall fall upon the symbol of the right lateral zone, or upon the symbol of the left lateral zone, according to the dominance of the right or the left eye of the subject. In other words, the spacing is proportionate to the increasing divergence of the lines incident to the increased distance of the target from the subject.

What is claimed is:—

1. The herein-described apparatus for testing eyes, consisting of a target having a mid-zone, and lateral zones on opposite sides of and of color contrasting with that of the mid-zone, said mid-zone being provided with a central spot or bull's-eye and the lateral zones each provided with a symbol, and means for obscuring or bringing to view said symbols at will; and a sighting device comprising a box-like body open at one end and of form and dimensions at said end to fit against the forehead and encompass the eyes of a subject but practically to exclude light, said device having at its forward end an opening of relatively small size centering in the vertical plane lying midway between the side walls of the box member.

2. The herein-described apparatus for testing eyes, consisting of a target having a mid-zone and lateral zones on opposite sides of and of color contrasting with that of the mid-zone, said mid-zone being provided with a central spot or bull's-eye and the lateral zones each provided with a symbol, and means for obscuring or bringing to view said symbols at will; and a sighting device comprising a box-like body open at one end and of form and dimensions at said end to fit against the forehead and encompass the eyes of a subject but practically to exclude light, said device having at its forward end an opening of relatively small size centering in the vertical plane lying midway between the side walls of the box member, and means for obstructing at will the sight line of either eye through the structure.

3. An eye-testing instrument, comprising a box-like body open at one end and of form and dimensions at said open end to fit against the forehead and encompass the eyes of a subject, said instrument having at its forward end a normally unobstructed opening of relatively small size centering in the vertical plane lying midway between the side walls of the box member, and through which the subject may freely observe an object forward of and beyond the instrument.

4. An eye-testing instrument comprising a box-like body open at one end and of form and dimensions at said end to fit against the forehead and encompass the eyes of a subject but practically to exclude light at said end, said instrument having at its forward end a normally unobstructed opening of relatively small size centering in the vertical plane lying midway between the side walls of the box member; and means for obstructing at will the sight line of either eye through the instrument.

5. The herein-described instrument, comprising a box-like section open at one end and of form and dimensions to encompass the eyes of average persons, and substantially to exclude the entrance of light at said end; a forward extension terminating in a relatively small and normally unobstructed opening centering in a vertical plane midway between the sides of the box member; and valves or shutters adapted to be thrown to and from position for intercepting at will the sight line of either eye through the instrument and through its forward opening.

6. A target for use in connection with a sighting device, comprising a mid-zone and lateral zones on opposite sides of and of color contrasting with that of the mid-zone, said mid-zone being provided with a central spot or bull's-eye and the lateral zones each provided with a symbol; and means for obscuring or bringing to view said symbols at will.

7. The herein-described apparatus for testing eyes, consisting of a target having a mid-zone, and lateral zones on opposite sides of and of color contrasting with that of the mid-zone, said mid-zone being provided with a central spot or bull's-eye and the lateral zones each provided with a symbol; and a sighting device comprising a box-like body open at one end and of form and dimensions at said end to fit against the forehead and encompass the eyes of a subject but practically to exclude light, said device having at its forward end an opening of relatively small size centering in the vertical plane lying midway between the side walls of the box member.

8. A target for use in connection with a sighting device, comprising a mid-zone and lateral zones on opposite sides of and of color contrasting with that of the mid-zone, said mid-zone being provided with a central spot or bull's-eye, and the lateral zones each provided with a symbol.

In testimony whereof I have signed my name to this specification.

GEORGE PARSON.